United States Patent
Thomas

(10) Patent No.: US 9,171,273 B2
(45) Date of Patent: Oct. 27, 2015

(54) INTEGRATED ELECTRONIC CHECKLIST DISPLAY SYSTEM

(75) Inventor: Lisa C. Thomas, Kirkland, WA (US)

(73) Assignee: The Boeing Company, Chicago, IL (US)

(*) Notice: Subject to any disclaimer, the term of this patent is extended or adjusted under 35 U.S.C. 154(b) by 470 days.

(21) Appl. No.: 13/028,418

(22) Filed: Feb. 16, 2011

(65) Prior Publication Data
US 2012/0209468 A1 Aug. 16, 2012

(51) Int. Cl.
*G06F 3/048* (2013.01)
*G06Q 10/06* (2012.01)
*G07C 5/00* (2006.01)

(52) U.S. Cl.
CPC ............... *G06Q 10/06* (2013.01); *G07C 5/006* (2013.01)

(58) Field of Classification Search
CPC .............................. G06Q 10/06; G07C 5/006
USPC ...................... 715/710, 714, 771; 701/1, 31.6
See application file for complete search history.

(56) References Cited

U.S. PATENT DOCUMENTS

| | | | |
|---|---|---|---|
| 5,454,074 A | 9/1995 | Hartel et al. | |
| 5,522,026 A | 5/1996 | Records et al. | |
| 6,018,340 A * | 1/2000 | Butler et al. | 715/764 |
| 6,262,720 B1 | 7/2001 | Jeffrey et al. | |
| 6,753,891 B1 | 6/2004 | Chohan et al. | |
| 7,142,131 B2 | 11/2006 | Sikora | |
| 7,392,486 B1 | 6/2008 | Gyde et al. | |
| 2004/0004557 A1 | 1/2004 | Sikora | |

OTHER PUBLICATIONS

EP search report dated Aug. 30, 2012 regarding application 12155841.5-1238-2490162, reference P53516EP/RGBH, applicant the Boeing Company, 6 pages.

* cited by examiner

*Primary Examiner* — Haoshian Shih
(74) *Attorney, Agent, or Firm* — Yee & Associates, P.C.

(57) ABSTRACT

A method and apparatus for electronic checklist display system. A checklist display device is connected to a number of display screens. A display screen within the number of display screens displays an integrated electronic checklist within a checklist display window on the display screen. The integrated electronic checklist comprises a number of checklist items associated with a vehicle system, systems information for the vehicle system, and graphics representing a current status of a number of components of the vehicle system.

20 Claims, 8 Drawing Sheets

INTEGRATED ELECTRONIC CHECKLIST DISPLAY SYSTEM

BACKGROUND INFORMATION

1. Field

The present disclosure relates generally to display systems and, in particular, to a method and apparatus for electronic checklist display systems. Still more particularly, the present disclosure relates to a method and apparatus for displaying electronic checklists with integrated systems information and graphics.

2. Background

A checklist is an information aid, typically in the form of a list of actions to be performed. Checklists may be utilized to assist with memory recall, verification, and performance improvement. Checklists may be used to verify that routine and non-routine tasks have been performed correctly.

Checklists may be maintained in a paper format. However, paper checklists may be difficult to update or modify. If checklist items are deferred for later performance, they may be forgotten. In addition, paper checklists do not provide an indication of checklist execution progress. Paper checklists may result in inefficiency due to the time required to locate the paper checklist, misreading the paper checklist, or misplacing the paper checklist.

An electronic checklist is a checklist presented to a user on a computing device or other display system rather than on paper. Electronic checklists may increase efficiency and reduce errors associated with paper checklists.

Current checklists typically only provide a brief identification of each task or action to be taken. A user may want to refer to other relevant information from another source that is more detailed or technical than the information available in a checklist. In such cases, a user may have to search one or more other sources for the relevant information prior to proceeding with performance of a checklist item.

For example, if a checklist item indicates adjusting a setting on a control panel, the user may have to locate synoptic information pages, other information identifying the correct settings, or identify other systems that may be impacted by changing those settings in a separate book, binder, or database of information.

Moreover, even if the user locates additional information to assist with completing the checklist item, that additional information may only provide a small portion of the information desired. In such cases, the user may expend additional time and effort searching.

Therefore, it would be advantageous to have a method and apparatus that takes into account one or more of the issues discussed above, as well as other potential issues not listed above.

SUMMARY

An advantageous embodiment provides an electronic checklist display system. A checklist display device is connected to a number of display screens. A display screen within the number of display screens displays an integrated electronic checklist within a checklist display window on the display screen. The integrated electronic checklist comprises a number of checklist items associated with a vehicle system, systems information for the vehicle system, and graphics representing a current status of a number of components of the vehicle system.

Another advantageous embodiment provides a method for displaying electronic checklists. An integrated electronic checklist is retrieved from a checklist database. The integrated electronic checklist is displayed within a checklist display window on a display device. The integrated electronic checklist includes a number of checklist items associated with a vehicle system, systems information for the vehicle system, and graphics representing a current state of a number of components of the vehicle system.

Still another advantageous embodiment provides a computer readable storage medium which stores computer usable program code. When the computer usable program code is executed by a processor, the computer usable program code performs a method for displaying electronic checklists. The method comprises retrieving an integrated electronic checklist corresponding to an occurrence of an event. The method also includes displaying the integrated electronic checklist within a checklist display window on a display device. The integrated electronic checklist comprises a number of checklist items associated with a vehicle system, systems information for the vehicle system, and graphics representing a current state of a number of components of the vehicle system.

Yet another advantageous embodiment provides an aircraft. The aircraft includes a number of aircraft systems. A checklist display device is connected to a number of display screens. A multi-function display screen within the number of display screens displays a number of checklist items associated with at least one aircraft system in the number of aircraft systems, systems information for the at least one aircraft system, and graphics representing a current status of a number of components of the at least one aircraft system within a checklist display window on a display device.

The features, functions, and advantages can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
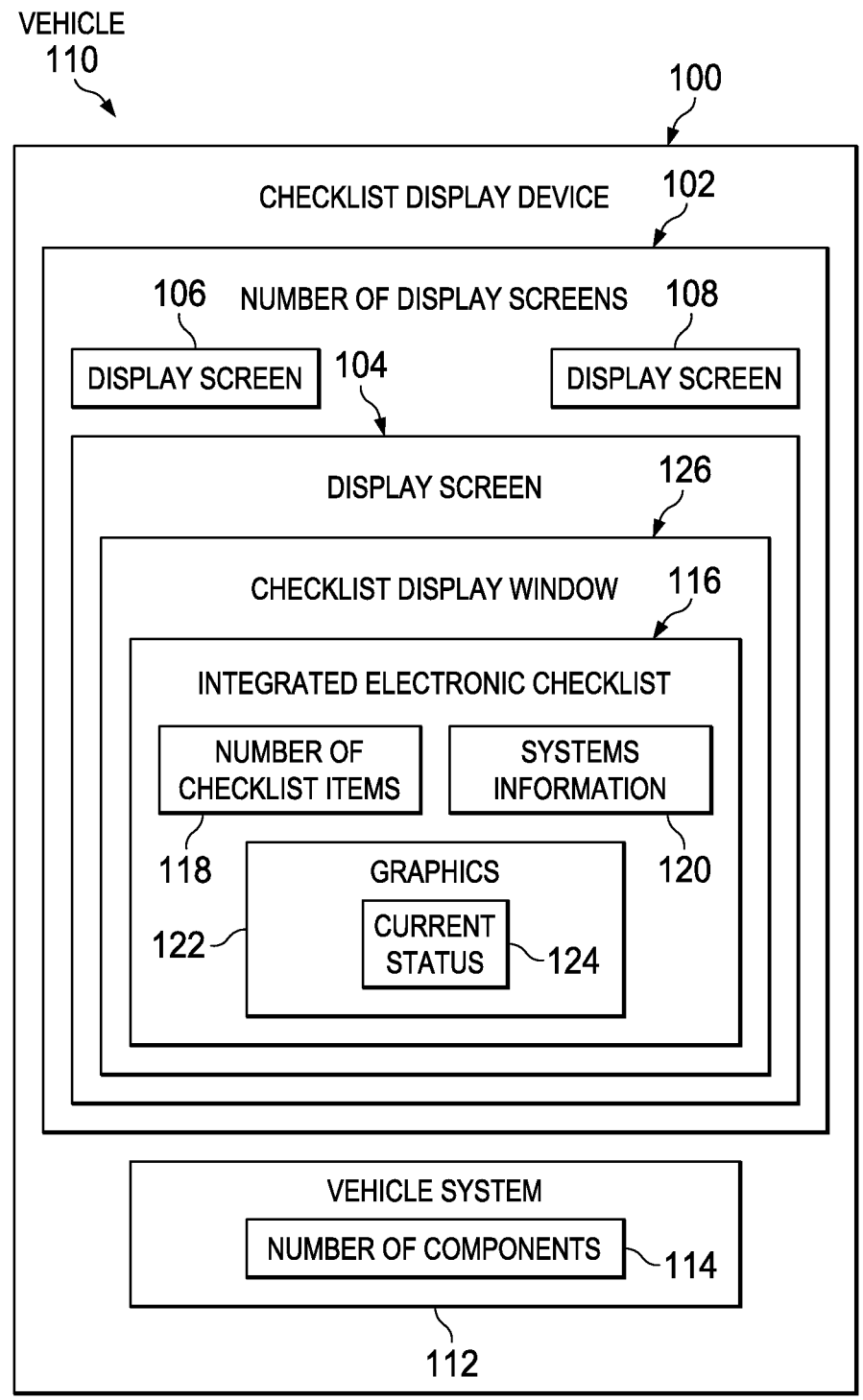
FIG. 1 is an illustration of a block diagram of an electronic checklist display device in which an advantageous embodiment may be implemented.

The different advantageous embodiments recognize and take into account a number of different considerations. For example, the different advantageous embodiments recognize and take into account that a user performing tasks described in a checklist may require additional information not available in the checklist. In other words, the advantageous embodiments recognize that the user performing the tasks in a checklist may want to refer to more detailed information than is provided in the brief description of each checklist item in the checklist.

The different advantageous embodiments also recognize that a user performing a checklist associated with vehicle systems or systems may obtain additional, detailed information for vehicle systems and system status from systems information pages for the vehicle. Systems information pages may also be referred to as synoptic pages or systems information synoptic pages.

Systems information pages may display the configuration and status of vehicle systems, such as, but without limitation, a vehicle hydraulic system, electric system, environmental system, thrust controls, flight management system, and fuel systems.

The advantageous embodiments recognize that vehicle crews may obtain information about vehicle systems and an understanding of vehicle system configurations from systems information pages. Systems information pages provide pilots and other vehicle crew with system configuration information and graphical depictions of system configuration.

The advantageous embodiments further recognize that systems information and synoptic information pages are not designed to assist a user with resolving non-normal situations. A non-normal situation is a non-routine or atypical situation that occurs infrequently or irregularly. The advantageous embodiments recognize and take into account that the user dealing with a non-normal or infrequent situation may require additional relevant information or more detailed instruction for performing checklist items associated with the non-normal or infrequent event.

The advantageous embodiments recognize that there is currently no direct association between electronic checklists and systems information pages. The advantageous embodiments recognize that current solutions provide electronic checklists and systems information pages that do not work in an integrated fashion.

The advantageous embodiments recognize that users have to select a relevant electronic checklist and separately select one or more related systems information pages from a number of options. In other words, the advantageous embodiments recognize that a user has to determine which systems information pages are most relevant to checklist items being performed in a given situation and then manually select those relevant systems information pages for viewing in separate windows or displays from the checklist itself.

The advantageous embodiments recognize that current solutions negatively impact the time taken to respond to checklist items. The advantageous embodiments also recognize that current solutions may negatively impact the time necessary for a user to understand the effects of actions taken or not taken on vehicle system(s). Moreover, the advantageous embodiment further recognizes that the time and resources expended in searching for additional relevant information in one or more other sources may also reduce efficiency and negatively impact the time taken to respond to checklist items.

The advantageous embodiments recognize that it would be beneficial to integrate electronic checklists with information pages. Therefore, an advantageous embodiment of the present disclosure provides a method for displaying integrated electronic checklists. An integrated electronic checklist is retrieved from a data storage device. The integrated electronic checklist is displayed within a checklist display window on a display device. The integrated electronic checklist includes a number of checklist items associated with a vehicle system, systems information for the vehicle system, and graphics representing a current state of a number of components of the vehicle system.

Figure 2:
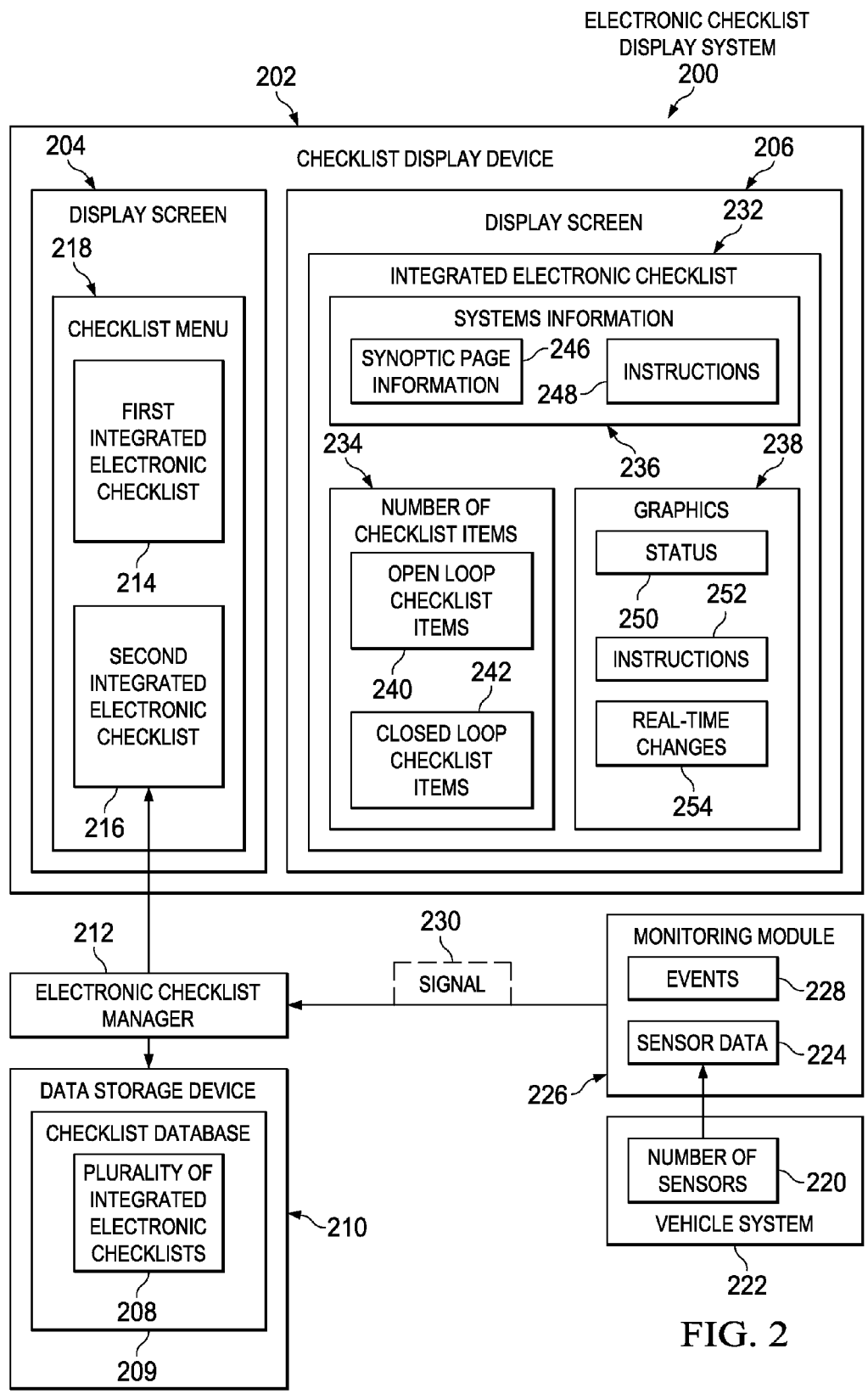
FIG. 2 is an illustration of a block diagram of an electronic checklist display system in which an advantageous embodiment may be implemented.

With reference now to the figures and, in particular, with reference to FIGS. 1 and 2, illustrative diagrams of checklist display system environments are provided in which the advantageous embodiments of the present invention may be implemented. It should be appreciated that FIGS. 1 and 2 are only illustrative and are not intended to assert or imply any limitation with regard to the environments in which different embodiments may be implemented. Many modifications to the depicted environments may be made.

Turning now to FIG. 1, an illustration of a block diagram of an electronic checklist display device is shown in which an advantageous embodiment may be implemented. Checklist display device 100 is a device for displaying data, graphics, and other images on number of display screens 102.

As used herein, a "number" of items refers to one or more items. Number of display screens 102 may include one or more display screens. In this advantageous embodiment, number of display screens 102 includes display screens 104, 106, and 108. However, the advantageous embodiments are not limited to including three display screens. Number of display screens 102 may include a single display screen, two display screens, as well as four or more display screens.

A display screen in number of display screens 102 is a screen for displaying an electronic checklist. A display screen in number of display screens 102 may be implemented as any display device, such as, without limitation, a monitor, a touch screen, a projected image, a television screen, a screen on a laptop, a screen on a cell phone, a screen on a tablet personal computer, a cathode ray tube (CRT), a liquid crystal display (LCD), or any other type of device that is able to display electronic data.

In another non-limiting advantageous embodiment, display screen 104 may be implemented as a multi-function display screen. A multi-function display screen may display data from multiple systems or sources.

An electronic checklist may be displayed on a single screen within number of display screens 102. However, in another advantageous embodiment, an electronic checklist may be displayed on two or more display screens within number of display screens 102. In yet another embodiment, a checklist being displayed on a first display screen may be moved to a second display screen within number of display screens 102.

In this advantageous embodiment, number of display screens 102 is mounted within vehicle 110. In this advantageous embodiment, but without limitation, vehicle 110 is an airplane. In another advantageous embodiment, vehicle 110 may be any type of vehicle, such as, but without limitation, an aircraft, an aerospace vehicle or space craft, a rotor craft such as a helicopter, an autogiro, a ship or boat, a submersible vehicle such as a submarine, or any other type of vehicle.

Vehicle 110 has one or more vehicle systems. Vehicle system 112 may be any type of system within vehicle 110. Vehicle system 112 may be, for example, but without limitation, a navigation system, an environmental system, a landing gear system, a propulsion system, or any other system.

Vehicle system 112 includes number of components 114. Number of components 114 may include one or more components of vehicle system 112. For example, if vehicle system 112 is a landing gear system, then number of components 114 may include a tire, a wheel axle, a shock absorber, a bogie beam, or any other component of a landing gear.

Integrated electronic checklist 116 is an electronic checklist for completing tasks associated with vehicle system 112. Integrated electronic checklist 116 includes number of checklist items 118. Each checklist item in number of checklist items 118 identifies a task to be completed, an action to be taken, or an item to be checked. In one advantageous embodiment, integrated electronic checklist 116 also includes at least one of systems information 120 and graphics 122.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Thus, in one advantageous embodiment, integrated electronic checklist 116 includes number of checklist items 118, systems information 120, and graphics 122. In yet another advantageous embodiment, integrated electronic checklist 116 includes number of checklist items 118 and graphics 122, but without systems information 120. In yet another advantageous embodiment, integrated electronic checklist 116 includes number of checklist items 118 and systems information 120, but without graphics 122.

Systems information 120 is information associated with at least one component in number of components 114 and at least one checklist item in number of checklist items 118. Systems information 120 may include synoptic page information for vehicle system 112, a description of one or more components in number of components 114, and/or instructions for performing an action or task identified in at least one checklist item in number of checklist items 118.

Graphics 122 includes graphical representations associated with number of components 114. Graphics 122 may include, for example and without limitation, text, icons, symbols, numbers, or graphical representations of one or more components within number of components 114.

In this advantageous embodiment, graphics 122 represents current status 124 of number of components 114 of vehicle system 112. In another advantageous embodiment, graphics 122 represents real-time changes to vehicle system 112 as one or more checklist items in number of checklist items 118 is completed. In still another advantageous embodiment, graphics 122 includes graphical instructions for completing a task or action associated with one or more checklist items in number of checklist items 118.

In another non-limiting advantageous embodiment, graphics 122 includes graphics representing the relevant portion of the affected systems information 120 embedded with each checklist item in number of checklist items 118. The term "embedded" refers to displaying graphics 122 and systems information 120 within a close proximity to one or more checklist items within checklist display window 126.

Checklist display window 126 is a window on display screen 104. Integrated electronic checklist 116 is displayed in the checklist display window 126 on the display screen 104. In this advantageous embodiment, the display screen 104 is shown with only a single window. However, in another non-limiting advantageous embodiment, display screen 104 may display a number of windows.

Integrated electronic checklist 116 is displayed in checklist display window 126 on display screen 104. All information and parts of integrated electronic checklist 116 are displayed within checklist display window 126. In other words, number of checklist items 118, systems information 120, and graphics 122 are displayed in checklist display window 126. Integrated electronic checklist 116 integrates and associates checklist data within number of checklist items 118, systems information 120, and graphics 122.

Integrated electronic checklist 116 displays graphics 122 and systems information 120 showing actions performed in real-time to indicate changes to the vehicle system 112. In one non-limiting advantageous embodiment, the integrated electronic checklist 116 provides a display in real-time of data in a checklist format to instruct and indicate actions required, initiated, or completed by a user.

FIG. 2 is an illustration of a block diagram of an electronic checklist display system in which an advantageous embodiment may be implemented. Electronic checklist display system 200 is a system for managing, displaying, and updating electronic checklists.

Checklist display device 202 is a display device for displaying electronic checklists, such as checklist display device 100 in FIG. 1. Checklist display device 202 includes one or more display screens, such as, but without limitation, display screens 204 and 206.

Display screens 204 and 206 are screens for displaying electronic data, such as display screens 104, 106, and 108 in FIG. 1. In one non-limiting advantageous embodiment, display screens 204 and 206 are display screens in a cockpit or flight deck of an aircraft.

Electronic checklist display system 200 may include plurality of integrated electronic checklists 208 within checklist database 209. Checklist database 209 may be implemented as any type of database, such as, without limitation, a relational database, a redundant array of independent disks (RAID) database, or any other type of database.

Plurality of integrated electronic checklists 208 is stored on data storage device 210. Data storage device 210 may be implemented as any type of data storage device, such as, without limitation, a hard disk drive, a main memory, a flash drive, a random access memory (RAM), a read only memory (ROM), or any other type of device for storing data.

Plurality of integrated electronic checklists 208 are predefined or pre-generated integrated electronic checklists. Each integrated electronic checklist in plurality of integrated electronic checklists 208 is a checklist such as integrated electronic checklist 116 in FIG. 1.

Electronic checklist manager 212 is an application for identifying one or more integrated electronic checklists within plurality of integrated electronic checklists 208 to be completed. Electronic checklist manager 212 may be implemented as an entirely hardware module, an entirely software module, or as a combination of hardware and software.

In this example, electronic checklist manager 212 identifies first integrated electronic checklist 214 and second integrated electronic checklist 216 for display. Electronic checklist manager 212 displays a title of first integrated electronic checklist 214 and second integrated electronic checklist 216 within checklist menu 218 on display screen 204.

In this advantageous embodiment, only two integrated electronic checklists are listed in checklist menu 218. However, in another advantageous embodiment, three or more integrated electronic checklists may be listed in checklist menu 218.

In this advantageous embodiment, electronic checklist manager 212 displays a title of each of the identified integrated electronic checklists in checklist menu 218 in an order of priority. In other words, first integrated electronic checklist 214 in this example is associated with a higher priority task or tasks and/or a higher priority vehicle system, while second integrated electronic checklist 216 is associated with a lower priority vehicle system and/or a lower priority task or tasks.

In another advantageous embodiment, titles of integrated checklists that have been identified for completion by electronic checklist manager 212 may be displayed in an alphabetical order rather than an order of priority. In still another advantageous embodiment, titles of integrated electronic checklists are listed in checklist menu 218 in chronological order, or any other order. Chronological order refers to the order in which the events to which the titles refer occurred.

The checklists within plurality of integrated electronic checklists 208 are associated with one or more vehicle systems, such as vehicle system 222. Vehicle system 222 is a system within a vehicle, such as vehicle system 112 in FIG. 1.

Vehicle system 222 in this advantageous embodiment is connected to number of sensors 220. Number of sensors 220 includes one or more sensors. A sensor in number of sensors 220 may be any type of sensor for detecting a state of a component within vehicle system 222, such as, but without limitation, a proximity sensor, a temperature sensor, an altitude sensor, a pressure sensor, a thermal sensor, a motion sensor, or any other type of sensor.

In this non-limiting advantageous embodiment, the electronic checklist display system 200 generates an event triggered, real-time integrated electronic checklist display. Number of sensors sensor 220 transmits sensor data 224 to monitoring module 226. Monitoring module 226 is a component for monitoring sensor data 224 received from one or more sensors in number of sensors 220. Monitoring module 226 monitors sensor data 224 for the occurrence of one or more events 228.

Events 228 include one or more pre-defined events that trigger display of integrated electronic checklist 232. In one advantageous embodiment, an event is a pre-defined event, status, or condition of a component within vehicle system 222, such as a given temperature, altitude, pressure, or any other condition or status. In another advantageous embodiment, a pre-defined event in events 228 may be a given time or passage of a pre-determined time interval. In yet another advantageous embodiment, an event in events 228 may be receipt of input from a user selecting an integrated electronic checklist from checklist menu 218 for display.

In response to receiving sensor data 224 indicating an occurrence of a pre-defined event, the monitoring module 226 sends signal 230 to the electronic checklist manager 212. Signal 230 triggers electronic checklist manager 212 to display one or more integrated electronic checklists.

In one non-limiting example, electronic checklist manager 212 receives or detects signal 230 which indicates an occurrence of an event in events 228. Electronic checklist manager 212 identifies and retrieves an integrated electronic checklist corresponding to the event from plurality of integrated electronic checklists 208. Electronic checklist manager 212 may utilize any known or available method for identifying an integrated electronic checklist corresponding to the event.

For example, but without limitation, electronic checklist manager 212 may consult a look-up table, utilize an identifier, search for criteria or other key words in a database, or any other method for selecting a corresponding electronic checklist. Electronic checklist manager 212 initiates display of the integrated electronic checklist corresponding to the event on display screen 206.

Integrated electronic checklist 232 is an electronic checklist, such as integrated electronic checklist 116 in FIG. 1. Integrated electronic checklist 232 in this advantageous embodiment includes number of checklist items 234, systems information 236, and graphics 238.

Number of checklist items 234 is one or more checklist items, such as number of checklist items 118 in FIG. 1. The checklist items in number of checklist items 234 may include open loop checklist items 240. An open loop checklist item is an item on a checklist that is acknowledged by a user. A sensor may not be interrogated to determine if an action associated with an open loop checklist item has been performed (either by the user or by automation).

A user manually acknowledges or indicates that an action associated with an open loop checklist item has been completed. In one non-limiting advantageous embodiment, a user indicates that the action associated with the open loop checklist item is completed by selecting a "done" key on a user interface or clicking on a "done" field for the checklist item.

For example, an open loop checklist item may require a user to flip a switch, enter data, or otherwise complete an action. However, in another advantageous embodiment, number of checklist items 234 may not include any open loop checklist items.

In this advantageous embodiment, number of checklist items 234 may include one or more closed loop checklist items 242. A closed loop checklist item is a checklist item that may be acknowledged automatically without any action being taken by the user.

A sensor may be interrogated to see if an action associated with a checklist item is performed or completed. For example, a closed loop checklist item may require a confirmation that a landing gear is lowered. In this example, a sensor on the landing gear may automatically indicate when the landing gear is lowered, and check off the closed loop checklist item without any input or actions being taken by any user.

Systems information 236 may be information such as systems information 120 in FIG. 1. In this advantageous embodiment, systems information 236 includes synoptic page information 246 describing vehicle system 222 and/or instructions 248 for completing one or more checklist items in number of checklist items 234. In one advantageous embodiment, integrated electronic checklist 232 integrates synoptic page information 246 and additional real-time graphics 238 to provide an integrated electronic checklist display presentation in real time of data used to instruct or indicate actions associated with number of checklist items 234. The actions may be actions required, actions initiated, and/or actions already completed.

Graphics 238 is graphical representations associated with number of checklist items 234 and/or vehicle system 222, such as graphics 122 in FIG. 1. Graphics 238 includes graphics representing status 250 of vehicle system 222, instructions 252 for completing number of checklist items 234, and real-time changes 254 to vehicle system 222 as checklist item(s) are completed.

In one non-limiting advantageous embodiment, integrated electronic checklist 232 includes graphics 238 illustrating specific relevant parts of synoptic page information 246 and other systems information 236 collocated with checklist items whose results affect a status of vehicle system 222.

In this advantageous embodiment, checklist menu 218 displays a list of titles of integrated electronic checklists to be performed before displaying any one of the integrated electronic checklists to the user. An integrated electronic checklist is only displayed when a selection of one of the integrated electronic checklist titles in checklist menu 218 is selected.

In another non-limiting example, the highest priority checklist in checklist menu 218 is automatically displayed in one window while checklist menu 218 is displayed in another window. In this example, if a user selects a different integrated electronic checklist for display from checklist menu 218, electronic checklist manager 212 then replaces the highest priority checklist display with a display of the selected integrated electronic checklist.

In yet another non-limiting advantageous embodiment, if electronic checklist manager 212 determines that only one integrated electronic checklist is to be performed, electronic checklist manager 212 automatically displays the integrated electronic checklist that needs to be performed. In this example, electronic checklist manager 212 does not display checklist menu 218. Thus, the one integrated electronic checklist is shown as the initial screen and the user does not go through menu options to select a checklist from checklist menu 218.

In still another advantageous embodiment, when electronic checklist manager 212 receives input, such as signal 230 or user input acknowledging completion of a checklist item in number of checklist items 234, electronic checklist manager 212 identifies real-time changes 254 to vehicle system 222 resulting from the completion of the checklist item. In this non-limiting advantageous embodiment, the changes resulting from the completion of a checklist item may be changes to one or more components of vehicle system 222. In another non-limiting example, the changes may be changes in the current status 250 of one or more components of vehicle system 222.

Electronic checklist manager 212 updates graphics 238 within integrated electronic checklist 232 showing real-time changes 254. In one non-limiting example, updating graphics 238 to reflect real-time changes 254 resulting from the completion of the checklist item may include changing graphics 238 to reflect changes to one or more of the components of vehicle system 222. In another non-limiting example, graphics 238 may be updated to reflect real-time changes 254 in the current status 250 of one or more components in vehicle system 222.

Figure 3:
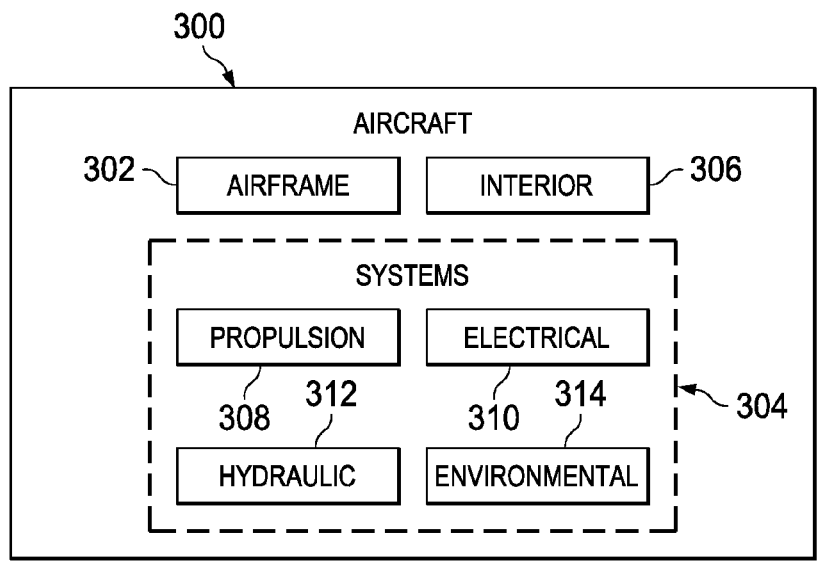
FIG. 3 is an illustration of a block diagram of aircraft systems in accordance with an advantageous embodiment.

With reference now to FIG. 3, an illustration of a block diagram of aircraft systems is shown in accordance with an advantageous embodiment. An aircraft 300 is an example of a vehicle such as, but without limitation, vehicle 110 in FIG. 1.

In this example, aircraft 300 may include airframe 302 with plurality of systems 304 and interior 306. Systems 304 are systems in aircraft 300, such as vehicle system 112 in FIG. 1 and vehicle system 222 in FIG. 2. Examples of systems 304 may include, but without limitation, one or more of propulsion system 308, electrical system 310, hydraulic system 312, and environmental system 314. Any number of other systems may be included within systems 304.

In one non-limiting advantageous embodiment, an integrated electronic checklist integrates synoptic information view pages, available checklist data, and real-time graphics into an electronic checklist display of data used to instruct or indicate actions required, actions initiated, or actions completed by flight crew of airplane 300 to resolve normal or non-normal conditions.

In another non-limiting advantageous embodiment, the integrated electronic checklist immediately provides a pilot or other flight crew of airplane 300 with information and graphics detailing when and how each action taken to complete number of checklist items 118 in FIG. 1 affects systems 304.

FIG. 3 is intended as an example. FIG. 3 is not intended as an architectural limitation for the different advantageous embodiments. For example, although an aerospace example is shown, different advantageous embodiments may be applied to other vehicles, such as automobiles, helicopters, boats, ships, submarines, construction vehicles, or any other type of vehicle.

Figure 4:
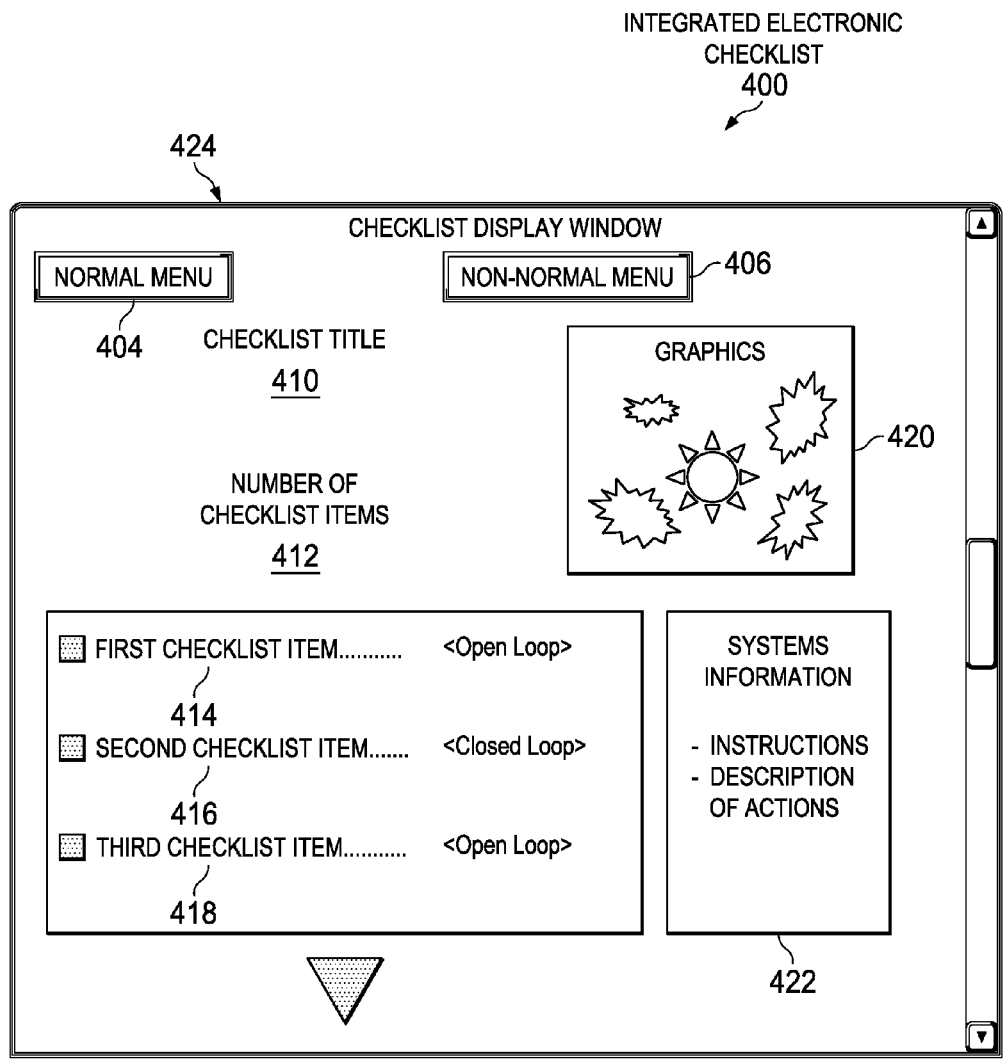
FIG. 4 is an illustration of a block diagram of an integrated electronic checklist in accordance with an advantageous embodiment.

FIG. 4 is an illustration of a block diagram of an integrated electronic checklist in accordance with an advantageous embodiment. Integrated electronic checklist 400 is an electronic checklist such as integrated electronic checklist 116 in FIG. 1 and integrated electronic checklist 232 in FIG. 2.

Normal menu 404 is a button or link to a menu of electronic checklists for normal conditions. A normal condition is a routine or typical condition or situation. The integrated electronic checklists in normal menu 404 are checklists that may be used during routine or normal situations.

Non-normal menu 406 is a button or link to a menu of non-normal integrated electronic checklists that may need to be completed to resolve a non-normal situation. A non-normal situation is a non-routine or atypical condition or situation. An integrated electronic checklist in non-normal menu 406 is a checklist that may resolve a non-normal situation.

Checklist title 410 is a title of integrated electronic checklist 400. Integrated electronic checklist 400 integrates and associates number of checklist items 412, graphics 420, and systems information 422.

Number of checklist items 412 is one or more checklist items, such as number of checklist items 118 in FIG. 1 and number of checklist items 234 in FIG. 2. In this example, number of checklist items 412 includes first checklist item 414, second checklist item 416, and third checklist item 418.

First checklist item 414 and third checklist item 418 in this example are open loop checklist items, such as open loop checklist items 240 in FIG. 2. Second checklist item 416 is a closed loop checklist item, such as closed loop checklist items 242 in FIG. 2.

In this advantageous embodiment, number of checklist items 412 includes three checklist items. However, in another advantageous embodiment, number of checklist items 412 may include a single checklist item, two checklist items, or four or more checklist items.

Graphics 420 may include graphics representing a current status of a vehicle system, such as graphics 122 in FIG. 1 and graphics 238 in FIG. 2.

In this advantageous embodiment, graphics 420 includes graphical representations of a relevant portion of the affected vehicle systems. In another advantageous embodiment, graphics 420 includes instructions for completing a checklist item in number of checklist items 412.

In yet another advantageous embodiment, graphics 420 updates in real-time dynamically to provide an indication of how checklist actions performed affect or affected system status or condition. In still another advantageous embodiment, graphics 420 may be used to instruct or indicate actions required, initiated, performed, or completed by a user to resolve non-normal situations.

Systems information 422 may include a description of one or more vehicle systems, such as systems information 120 in FIG. 1 and systems information 236 in FIG. 2. In another advantageous embodiment, systems information 422 includes instructions for completing one or more checklist items. In yet another advantageous embodiment, systems information 422 includes relevant portions of systems information pages for one or more vehicle systems.

FIG. 4 is intended as an example. FIG. 4 is not intended as an architectural limitation for the different advantageous embodiments.

Number of checklist items 412, graphics 420, and systems information 422 are displayed together within the checklist display window 424. Checklist display window 424 is a window on a display screen, such as checklist display window 126 in FIG. 1.

Figure 5:
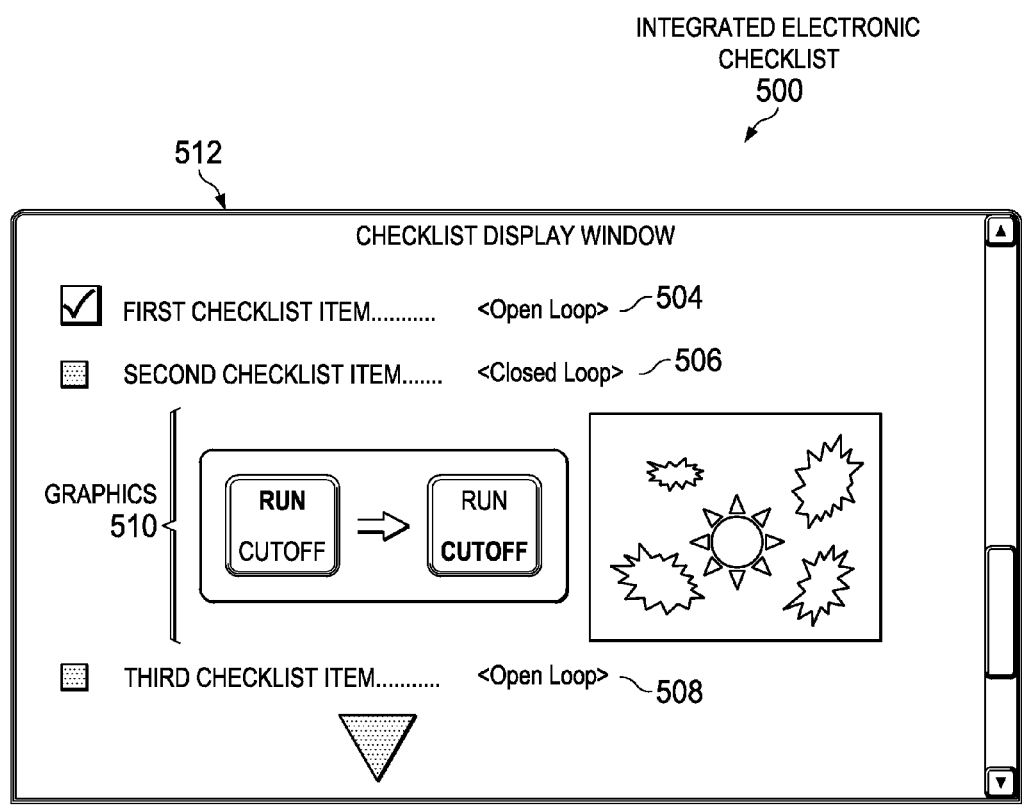
FIG. 5 is an illustration of a block diagram of an updated integrated electronic checklist in accordance with an advantageous embodiment.

Referring now to FIG. 5, an illustration of a block diagram of an updated integrated electronic checklist is depicted in accordance with an advantageous embodiment. Integrated electronic checklist 500 is an electronic checklist, such as integrated electronic checklist 116 in FIG. 1, integrated electronic checklist 232 in FIG. 2, and integrated electronic checklist 400 in FIG. 4. Integrated electronic checklist 500 is a checklist that has been updated in response to completion of at least one checklist item.

In this advantageous embodiment, first checklist item 504 has already been completed and checked off. Second checklist item 506 is an incomplete, closed loop checklist item, such as closed loop checklist items 242 in FIG. 2. Third checklist item 508 is an incomplete open looped checklist item, such as open looped checklist items 240 in FIG. 2.

Graphics 510 are graphics illustrating a current status of one or more components and/or representations of actions to be performed. Graphics 510 may be graphics such as graphics 122 in FIG. 1 and graphics 238 in FIG. 2. Graphics 510 are updated in real-time to represent changes to one or more vehicle systems as checklist items are completed.

In this advantageous embodiment, graphics 510 are associated with second checklist item 506. Graphics 510 may include a graphical representation of one or more actions to be performed to complete second checklist item 506 and graphics representing a current state of one or more components.

Graphics 510 are embedded within the integrated electronic checklist 500. In other words, graphics 510 associated with second checklist item 506 are displayed within the same checklist display window 512 as second checklist item 506. Checklist display window 512 is a window on a display screen, such as checklist display window 126 in FIG. 1.

In one advantageous embodiment, a prompt function may indicate which checklist item is the next checklist item to be completed by a user. For example, once first checklist item 504 is completed and checked off, the prompt function moves a cursor or other indicator to second checklist item 506 indicating that the user should begin performing actions identified in second checklist item 506. In yet another advantageous embodiment, the prompt function displays graphics 510 and/or any systems information associated with second checklist item 506 as part of the prompt indicating that second checklist item 506 is the next checklist item that needs to be completed.

FIG. 5 is intended as an example. FIG. 5 is not intended as an architectural limitation for the different advantageous embodiments.

Figure 6:
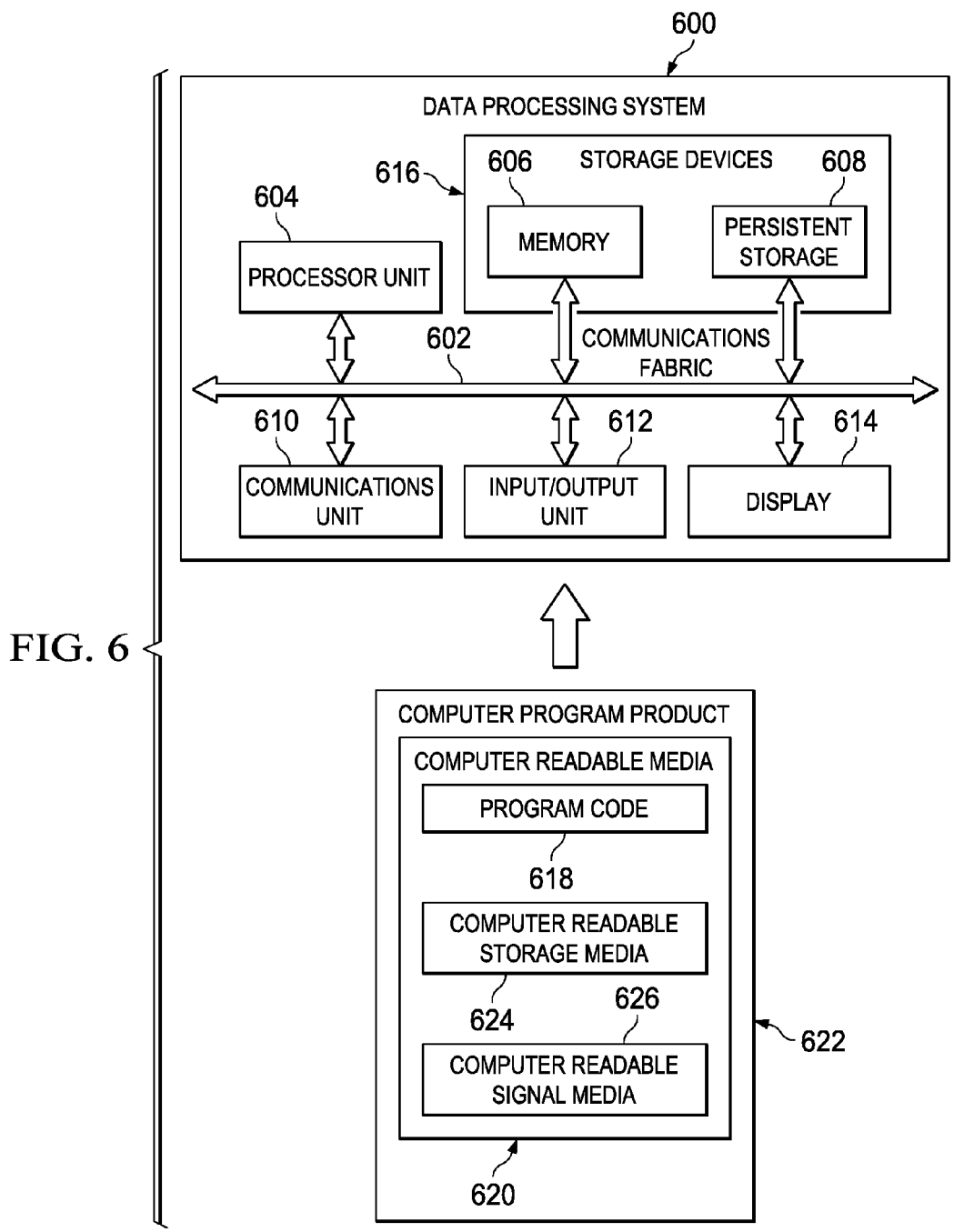
FIG. 6 is an illustration of a data processing system in accordance with an advantageous embodiment.

Turning now to FIG. 6, an illustration of a data processing system is depicted in accordance with an advantageous embodiment. Data processing system 600 is an example of a data processing system that may be used to implement a checklist display system, such as checklist display device 100 in FIG. 1 and electronic checklist display system 200 in FIG. 2. Further, data processing system 600 is an example of a data processing system that may be found in aircraft 300 in FIG. 3.

Processor unit 604 serves to execute instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory (RAM), or any other suitable volatile or non-volatile storage device. The persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer.

Display 614 provides a mechanism to display information to a user. Display 614 may be a display screen connected to a display device, such as display screen 104 in FIG. 1 and display screen 206 in FIG. 2.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by the processor unit 604. Processes of the different embodiments may be performed by processor unit 604 using computer implemented instructions, which may be located in memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by the processor unit 604. Program code 618 and the computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600. In these illustrative examples, computer readable storage media 624 is a non-transitory computer readable storage medium.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 618 may be downloaded over a network to persistent storage 608 from another device or data processing system through the computer readable signal media 626 for use within data processing system 600. For instance, program code stored in a computer readable storage medium in a server data processing system may be downloaded over a network from the server to data processing system 600. Data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different advantageous embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

FIG. 6 is intended as an example. FIG. 6 is not intended as an architectural limitation for the different advantageous embodiments.

Figure 7:
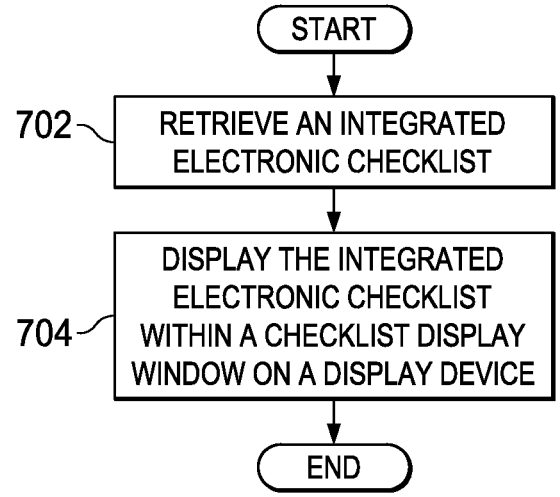
FIG. 7 is an illustration of a flowchart illustrating a process for displaying electronic checklists in accordance with an advantageous embodiment.

FIG. 7 is an illustration of a flowchart illustrating a process for displaying electronic checklists in accordance with an advantageous embodiment. The process illustrated in FIG. 7 may be implemented by a checklist display system for displaying electronic checklists, such as, without limitation, checklist display device 100 in FIG. 1 or electronic checklist display system 200 in FIG. 2. More particularly, operation 702 may be implemented by electronic checklist manager 212 in FIG. 2. Operation 704 may be implemented by a display device, such as checklist display device 100 in FIGS. 1 and 202 in FIG. 2.

An integrated electronic checklist is retrieved (operation 702). The integrated electronic checklist is displayed within a checklist display window on a display device (operation 704) with the process terminating thereafter. In this advantageous embodiment, the integrated electronic checklist comprises a number of checklist items, systems information, and graphics.

Figure 8:
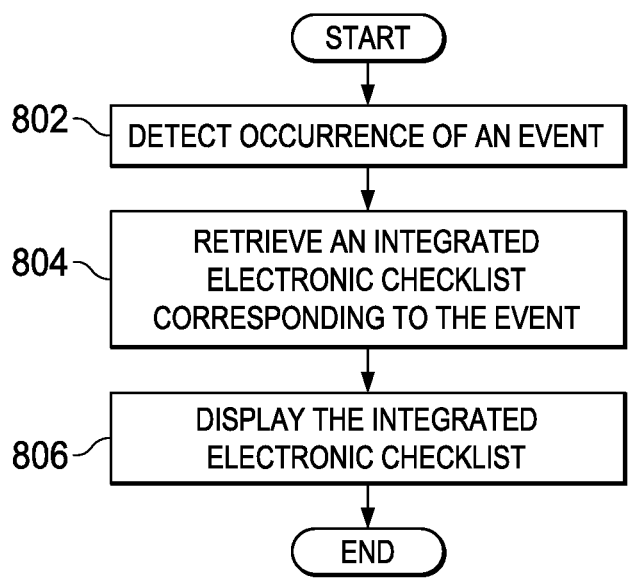
FIG. 8 is an illustration of a flowchart illustrating a process for event-triggered display of electronic checklists in accordance with an advantageous embodiment.

Turning now to FIG. 8, an illustration of a flowchart illustrating a process for event-triggered display of electronic checklists is shown in accordance with an advantageous embodiment. The process illustrated in FIG. 8 may be implemented by a checklist display system for displaying electronic checklists, such as, without limitation, electronic checklist display system 200 in FIG. 2. More particularly, the process in FIG. 8 may be implemented by electronic checklist manager 212 in FIG. 2.

The process begins by detecting an occurrence of an event (operation 802). An integrated electronic checklist corresponding to the event is retrieved (operation 804). The integrated electronic checklist is displayed (operation 806) with the process terminating thereafter.

Figure 9:
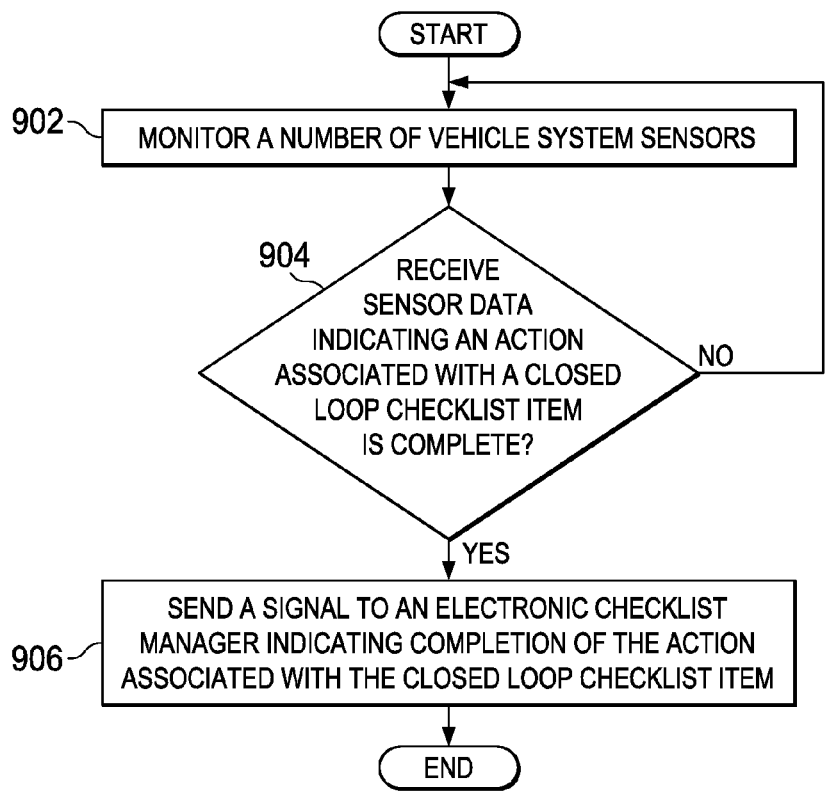
FIG. 9 is an illustration of a flowchart illustrating a process for updating integrated electronic checklists in accordance with an advantageous embodiment.

FIG. 9 is an illustration of a flowchart illustrating a process for updating integrated electronic checklists in accordance with an advantageous embodiment. The process illustrated within FIG. 9 may be implemented by a component for monitoring a number of vehicle systems, such as, without limitation, monitoring module 226 in FIG. 2.

A number of vehicle system sensors is monitored (operation 902). A determination is made as to whether sensor data indicating an action associated with a closed loop checklist item is complete is received (operation 904). If no, the process returns to operation 902.

When sensor data indicating an action associated with a checklist item is received at operation 904, a signal is sent to an electronic checklist manager indicating completion of the action associated with the closed loop checklist item (operation 906) with the process terminating thereafter.

In one non-limiting embodiment, the checklist manager updates the electronic checklist to indicate the closed loop checklist item is completed. In another non-limiting example, the checklist manager may also update graphics and systems information to reflect changes in vehicle systems due to completion of the closed loop checklist item.

Figures 10, 11:
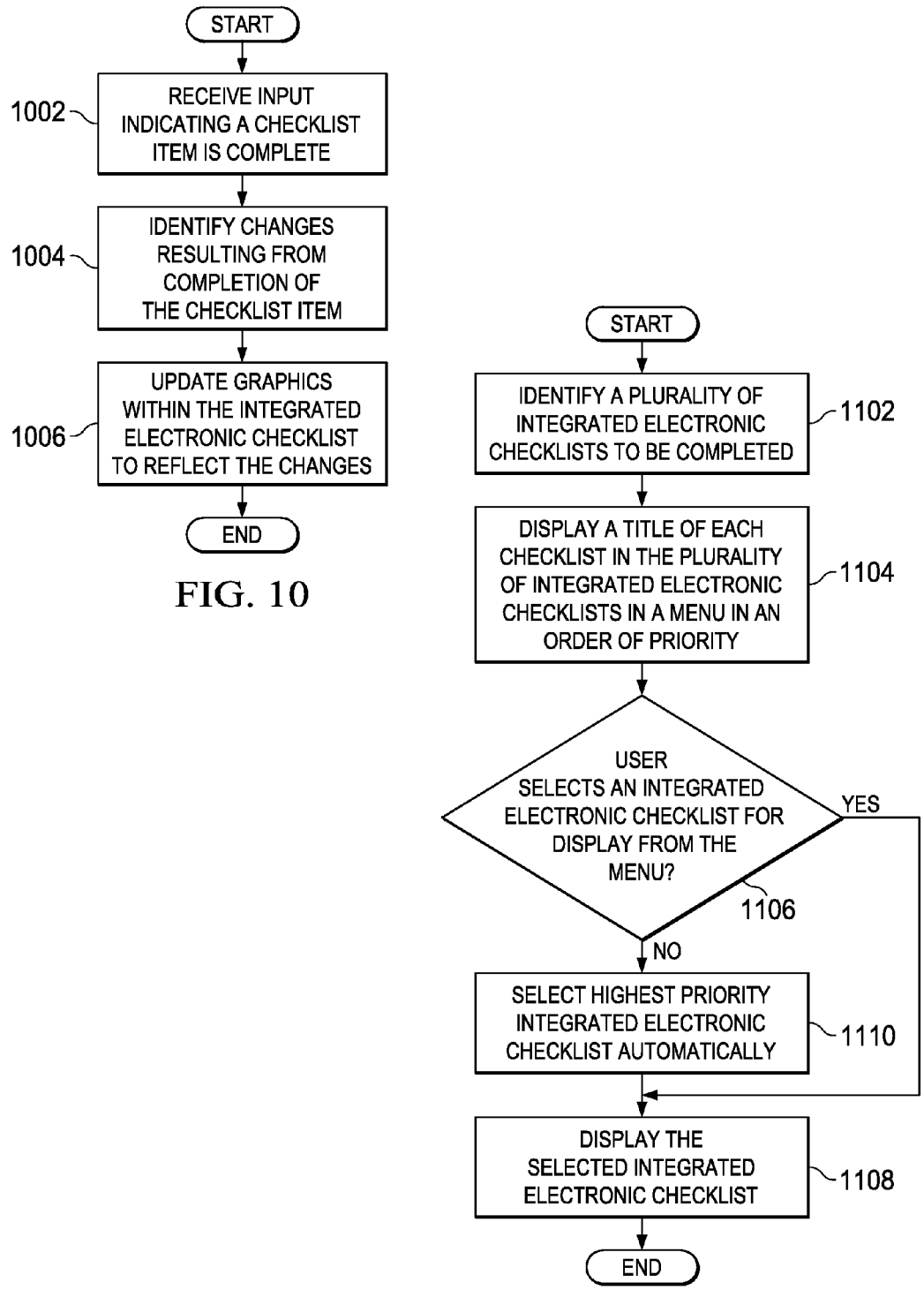
FIG. 10 is an illustration of a flowchart of a process for updating graphics in an integrated electronic checklist in accordance with an advantageous embodiment.
FIG. 11 is an illustration of a flowchart illustrating a process for selecting a plurality of integrated electronic checklists in accordance with an advantageous embodiment.

Turning now to FIG. 10, an illustration of a flowchart of a process for updating graphics in an integrated electronic checklist is shown in accordance with an advantageous embodiment. The process in FIG. 10 is implemented by electronic checklist manager 212 in FIG. 2.

The process begins by receiving input indicating a checklist item is complete (operation 1002). In one non-limiting example, the input may be input from a user acknowledging that an action associated with the checklist item has been performed or otherwise indicating the checklist item is complete. In another non-limiting example, the input is received from one or more sensors automatically indicating that the checklist item is complete.

The process identifies changes resulting from the completion of the checklist item (operation 1004). In this non-limiting advantageous embodiment, the changes resulting from the completion of the checklist item may be changes to one or more components of a vehicle system. In another non-limiting example, the changes may be changes in the current status of one or more components of the vehicle system.

The graphics within the integrated electronic checklist are updated to reflect the changes (operation 1006) with the process terminating thereafter. In one non-limiting example, updating the graphics to reflect the changes resulting from the completion of the checklist item may include changing the graphics to reflect changes to one or more of the components of a vehicle system. In another non-limiting example, the graphics may be updated to reflect changes in the current status of one or more components in a vehicle system.

FIG. 11 is an illustration of a flowchart illustrating a process for selecting a checklist from a plurality of integrated electronic checklists in accordance with an advantageous embodiment. The process illustrated in FIG. 11 may be implemented by an application for managing a plurality of electronic checklists, such as, but without limitation, electronic checklist manager 212 in FIG. 2.

The process begins by identifying a plurality of integrated electronic checklists to be completed (operation 1102). A title of each checklist in the plurality of integrated electronic checklists is displayed in an order of priority in a menu (operation 1104). A determination is made as to whether a user selects an integrated electronic checklist for display from the menu (operation 1106). If yes, the selected integrated electronic checklist is displayed (operation 1108) with the process terminating thereafter.

Returning now to operation 1106, if a user does not select an integrated electronic checklist for display, a highest priority integrated electronic checklist is selected automatically (operation 1110). The selected integrated electronic checklist is displayed (operation 1108) with the process terminating thereafter.

Thus, the advantageous embodiments provide a method and apparatus for displaying electronic checklists. A checklist display device is connected to a number of display screens. A display screen within the number of display screens displays an integrated electronic checklist within a checklist display window on the display screen. The integrated electronic checklist comprises a number of checklist items associated with a vehicle system, systems information for the vehicle system, and graphics representing a current status of a number of components of the vehicle system.

The advantageous embodiments integrate electronic checklist data with relevant data from systems information pages to create an integrated electronic checklist and systems information display. The integrated electronic checklist and systems information display is linked to the normal and non-normal conditions that trigger checklist performance. The integrated electronic checklist and systems information display of the advantageous embodiments provides users with timely task instructions and systems information to understand the need for those tasks to be completed. The integrated electronic checklist and systems information display may be utilized to enhance user decision making and reduce the occurrence of undesirable results.

The advantageous embodiments integrate electronic checklists with graphics and/or systems information pages to increase task efficiency, improve task performance, and promote improved situation awareness. The integrated graphical checklists may be used to improve performance of tasks to be completed on an infrequent basis and tasks performed to resolve non-normal or atypical conditions when those conditions arise. The integrated checklists promote greater problem-solving capability and situation awareness for users.

Moreover, the integrated checklists of the advantageous embodiments may be utilized in aircraft and other vehicles to improve vehicle crew response time. The integrated checklists may also be utilized by pilots, drivers, vehicle crew, maintenance personnel, engineers, and other personnel to improve system understanding and knowledge of system configuration. The integrated electronic checklist of the advantageous embodiments may be used to track and display effects and consequences of actions taken or not taken. The integrated electronic checklists may be utilized for a variety of purposes, such as, but without limitation, decision making, maintenance, diagnostics, and resolution of non-normal situations during vehicle operation.

The flowchart and block diagrams in the Figures illustrate the architecture, functionality, and operation of possible implementations of systems, methods and computer program products according to various advantageous embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An electronic checklist display system comprising:
    a checklist display device connected to a number of display screens;
    a display screen within the number of display screens operative to display an integrated electronic checklist within a checklist display window on the display screen, in which the integrated electronic checklist comprises a number of checklist items associated with a vehicle system, systems information for the vehicle system, and graphics representing a current status of a number of components of the vehicle system; and
    an electronic checklist manager operative to identify a plurality of integrated electronic checklists to be performed by a user based on a current state of a number of vehicle systems, and to display a title of each integrated electronic checklist in the plurality of integrated electronic checklists in an order of priority on the display screen;
    wherein a checklist item of the number of checklist items is associated with a graphic of the graphics and the graphic is embedded within the checklist item.

2. The electronic checklist display system of claim 1 further comprising:
    a monitoring module operative to send a signal triggering display of the number of checklist items associated with the vehicle system, systems information for the vehicle system, and the graphics representing the current state of the number of components of the vehicle system within the checklist display window in response to detecting an occurrence of a pre-determined event.

3. The electronic checklist display system of claim 1 further comprising:
    a monitoring module operative to send a signal to an electronic checklist manager indicating a closed loop checklist item in the number of checklist items is completed in response to receiving sensor data indicating the closed loop checklist item is completed.

4. The electronic checklist display system of claim 1 further comprising:
    an electronic checklist database configured to store a plurality of integrated electronic checklists, wherein each integrated electronic checklist in the plurality of integrated electronic checklists comprises a number of checklist items associated with at least one vehicle system, systems information for the at least one vehicle system, and graphics representing the current state of a number of components of the at least one vehicle system.

5. The electronic checklist display system of claim 1, wherein the vehicle system is an aircraft system within an aircraft.

6. The electronic checklist display system of claim 1 further comprising:
a graphics module connected to the checklist display device and operative to display the graphics representing a number of actions associated with the number of checklist items, wherein the number of actions associated with the number of checklist items comprises at least one of actions to be performed by a user, actions initiated by the user, and actions completed by the user.

7. A method for displaying electronic checklists, the method comprising:
retrieving an integrated electronic checklist from a data storage device; and
displaying the integrated electronic checklist within a checklist display window on a display device, wherein the integrated electronic checklist comprises a number of checklist items associated with a vehicle system, systems information for the vehicle system, and graphics representing a current state of a number of components of the vehicle system;
identifying a plurality of integrated electronic checklists to be performed by a user based on a current state of a number of vehicle systems; and
displaying a title of each integrated electronic checklist in the plurality of integrated electronic checklists in an order of priority on the display screen;
wherein a checklist item of the number of checklist items is associated with a graphic of the graphics and the graphic is embedded within the checklist item.

8. The method of claim 7 further comprising:
responsive to completion of a checklist item in the number of checklist items associated with the vehicle system, updating the graphics representing the current state of the number of components of the vehicle system to reflect the completion of the checklist item.

9. The method of claim 7 further comprising:
monitoring sensor data received from a number of vehicle system sensors for an occurrence of a pre-defined event; and
sending a signal triggering display of the integrated electronic checklist in response to the sensor data indicating the occurrence of the pre-defined event.

10. The method of claim 9, wherein the occurrence of the pre-defined event is a non-normal event and wherein the integrated electronic checklist specifies a number of actions for resolving the non-normal event, and further comprising:
automatically displaying the integrated electronic checklist with instructions for performing the number of actions to resolve the non-normal event on a display screen.

11. The method of claim 7, wherein the number of checklist items comprises a closed loop checklist item, and further comprising:
monitoring a number of vehicle system sensors; and
sending a signal to an electronic checklist manager indicating the closed loop check list item is completed in response to receiving sensor data from the number of vehicle system sensors indicating an action to be performed for the closed loop checklist item is completed.

12. The method of claim 7 further comprising:
the identifying of the plurality of integrated electronic checklists to be completed, wherein each integrated electronic checklist in the plurality of integrated electronic checklists comprises a number of checklist items associated with at least one vehicle system, systems information for the at least one vehicle system, and graphics representing the current state of a number of components of the at least one vehicle system; and
the displaying of the title of each integrated electronic checklist in the plurality of integrated electronic checklists is in a menu in an order of priority.

13. The method of claim 7, wherein the vehicle system is an aircraft system within an aircraft.

14. The method of claim 7 further comprises:
identifying a number of actions associated with the number of checklist items within the integrated electronic checklist, wherein the graphics comprises a number of graphical representations of the number of actions, wherein the actions associated with the number of checklist items comprises at least one of actions to be performed by a user, actions initiated by the user, and actions completed by the user.

15. The method of claim 7 further comprising:
providing instructions for performing an action associated with a checklist item in the number of checklist items within the integrated electronic checklist, wherein the systems information and the graphics displayed in the checklist display window comprises the instructions for performing the action associated with the checklist item.

16. A computer readable storage medium storing computer usable program code which, when executed by a processor, performs a method for displaying electronic checklists comprising:
retrieving an integrated electronic checklist from a data storage device; and
displaying the integrated electronic checklist within a checklist display window on a display device, wherein the integrated electronic checklist comprises a number of checklist items associated with a vehicle system, systems information for the vehicle system, and graphics representing a current state of a number of components of the vehicle system
identifying a plurality of integrated electronic checklists to be performed by a user based on a current state of a number of vehicle systems; and
displaying a title of each integrated electronic checklist in the plurality of integrated electronic checklists in an order of priority on the display device;
wherein a checklist item of the number of checklist items is associated with a graphic of the graphics and the graphic is embedded within the checklist item.

17. An aircraft comprising:
a number of aircraft systems;
a checklist display device connected to a number of display screens; and
a multi-function display screen within the number of display screens operative to display a number of checklist items associated with at least one aircraft system in the number of aircraft systems, systems information for the at least one aircraft system, and graphics representing a current status of a number of components of the at least one aircraft system within a checklist display window on a display device; and
an electronic checklist manager operative to identify a plurality of integrated electronic checklists to be performed by a user based on a current state of the number of aircraft systems, and to display a title of each integrated electronic checklist in the plurality of integrated electronic checklists in an order of priority on the display device;

wherein a checklist item of the number of checklist items is associated with a graphic of the graphics and the graphic is embedded within the checklist item.

18. The electronic checklist display system of claim 1 further comprising the electronic checklist manager further operative to determine whether a selection of a title is made from a menu, the menu comprising the display of the title of each integrated electronic checklist identified.

19. The electronic checklist display system of claim 1 further comprising the display screen being a first display screen, the integrated electronic checklist being displayed on the first display screen and moved to a second display screen of a number of display screens that comprise the first display screen and second display screen.

20. The electronic checklist display system of claim 1, wherein the checklist item is a second checklist item and the graphic is displayed between the second checklist item and a third checklist item once a first checklist item is completed;
wherein each checklist item includes an indication of whether the checklist item is one of an open loop checklist item and a closed loop checklist item.

\* \* \* \* \*